(12) United States Patent
Brandin et al.

(10) Patent No.: US 11,713,027 B2
(45) Date of Patent: Aug. 1, 2023

(54) BRAKE PERFORMANCE OPTIMIZER

(71) Applicant: Ningbo Geely Automobile Research & Development Co., Ltd., Ningbo (CN)

(72) Inventors: Magnus Brandin, Mölnlycke (SE); David Ekholm, Onsala (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 189 days.

(21) Appl. No.: 17/200,804

(22) Filed: Mar. 13, 2021

(65) Prior Publication Data
US 2021/0197775 A1 Jul. 1, 2021

Related U.S. Application Data

(63) Continuation of application No. PCT/CN2019/106207, filed on Sep. 17, 2019.

(30) Foreign Application Priority Data

Sep. 18, 2018 (EP) ..................................... 18195260

(51) Int. Cl.
*B60T 7/22* (2006.01)
*B60T 17/00* (2006.01)
(Continued)

(52) U.S. Cl.
CPC ................ *B60T 7/22* (2013.01); *B60T 8/171* (2013.01); *B60T 8/172* (2013.01); *B60T 17/00* (2013.01);
(Continued)

(58) Field of Classification Search
CPC . B60T 7/22; B60T 8/171; B60T 8/172; B60T 17/00; B60T 17/221;
(Continued)

(56) References Cited

U.S. PATENT DOCUMENTS 4,498,711 A * 2/1985 Langley .................. B60T 17/18
303/1
4,790,606 A * 12/1988 Reinecke ................ F16D 66/00
73/862.12

(Continued)

FOREIGN PATENT DOCUMENTS

CN 1590798 A 3/2005
CN 202063131 U 12/2011
(Continued)

OTHER PUBLICATIONS

International Search Report from corresponding International Application No. PCT/CN2019/106207, dated Dec. 17, 2019, 3 pages.
(Continued)

*Primary Examiner* — Mussa A Shaawat
(74) *Attorney, Agent, or Firm* — Tucker Ellis LLP

(57) ABSTRACT

A brake system for controlling the brake performance of a vehicle includes a brake, a control unit connected to one or more external condition sensors, and one or more brake performance sensors. The external condition sensors obtain parameters regarding conditions surrounding the vehicle, which are monitored by a driver assistance unit to estimate a probability value that the brakes should be applied to avoid a collision. The brake performance sensors obtain parameters regarding conditions of the brake. The control unit receives the obtained parameters from the external condition sensors and the estimated probability value and determines a surrounding threat level of the vehicle. The control unit receives the obtained parameters from the brake performance sensors and determines a brake performance level, and heats the at least one brake if the brake performance level is below a first level and the surrounding threat level is above a second level.

20 Claims, 2 Drawing Sheets

(51) Int. Cl.
    B60T 17/22      (2006.01)
    B60T 8/171      (2006.01)
    B60T 8/172      (2006.01)
    B60W 10/04      (2006.01)
    B60W 10/184     (2012.01)
    B60W 30/09      (2012.01)
    B60W 30/18      (2012.01)
    B60W 40/06      (2012.01)
    F16D 66/00      (2006.01)

(52) U.S. Cl.
    CPC ........... B60T 17/221 (2013.01); B60W 10/04
        (2013.01); B60W 10/184 (2013.01); B60W
        30/09 (2013.01); B60W 30/18109 (2013.01);
        B60T 2201/022 (2013.01); B60T 2201/03
        (2013.01); B60T 2201/12 (2013.01); B60T
        2201/124 (2013.01); B60T 2210/10 (2013.01);
        B60T 2210/32 (2013.01); B60T 2210/36
        (2013.01); B60T 2270/406 (2013.01); B60W
        40/06 (2013.01); B60W 2510/18 (2013.01);
        B60W 2555/20 (2020.02); B60W 2710/00
        (2013.01); B60W 2710/184 (2013.01); F16D
        2066/001 (2013.01)

(58) Field of Classification Search
    CPC ........... B60T 2201/022; B60T 2201/03; B60T
        2201/12; B60T 2201/124; B60T 2210/10;
        B60T 2210/32; B60T 2210/36; B60T
        2270/406; B60W 30/09; B60W 30/18109;
        B60W 40/06; B60W 2510/18; B60W
        2555/20; B60W 2710/00; B60W
        2710/184; B60W 10/04; B60W 10/184
    See application file for complete search history.

(56)        References Cited

U.S. PATENT DOCUMENTS

| | | | | |
|---|---|---|---|---|
| 4,871,215 A * | 10/1989 | Takayama | ............... | B60T 13/57 |
| | | | | 192/221 |
| 5,176,065 A * | 1/1993 | Castel | ................. | B60T 13/72 |
| | | | | 303/114.3 |
| 5,278,764 A * | 1/1994 | Iizuka | .................. | B60T 13/662 |
| | | | | 180/170 |
| 5,332,296 A * | 7/1994 | Morita | ................. | B60T 8/1755 |
| | | | | 303/9.62 |
| 5,427,441 A * | 6/1995 | Otsu | ................... | B60T 8/17636 |
| | | | | 303/191 |
| 5,445,444 A * | 8/1995 | Rump | ................. | B60T 8/17636 |
| | | | | 303/186 |
| 5,447,363 A * | 9/1995 | Fukamachi | ........... | B60T 8/4809 |
| | | | | 180/169 |
| 5,513,907 A * | 5/1996 | Kiencke | ................. | G01N 19/02 |
| | | | | 303/174 |
| 5,524,974 A | 6/1996 | Fischle | | |
| 5,971,503 A * | 10/1999 | Joyce | .................... | B60T 8/3675 |
| | | | | 303/191 |
| 6,378,669 B1 * | 4/2002 | Kurasako | .............. | B60T 13/662 |
| | | | | 188/218 XL |
| 6,671,604 B1 * | 12/2003 | Frentz | .................... | B60T 8/172 |
| | | | | 180/197 |
| 6,823,242 B1 | 11/2004 | Ralph | | |
| 9,090,264 B1 * | 7/2015 | Zhao | ........................ | B60T 8/172 |
| 9,296,263 B2 * | 3/2016 | Muthukumar | ........... | B60T 1/10 |
| 10,860,023 B2 * | 12/2020 | Di Cairano | ........... | G08G 1/166 |
| 2003/0006644 A1 | 1/2003 | MacGregor | | |
| 2012/0065860 A1 * | 3/2012 | Isaji | ........................ | F02D 11/10 |
| | | | | 701/70 |
| 2013/0073164 A1 * | 3/2013 | Moore | .................. | B60T 17/221 |
| | | | | 701/71 |
| 2013/0297168 A1 * | 11/2013 | Svensson | .............. | B60T 8/1755 |
| | | | | 701/70 |
| 2014/0272810 A1 * | 9/2014 | Fields | .................... | G09B 5/125 |
| | | | | 434/65 |
| 2017/0052540 A1 * | 2/2017 | Lokesh | ............... | B60W 30/165 |
| 2017/0203745 A1 * | 7/2017 | Kumar | .................... | B61L 25/02 |
| 2018/0229698 A1 * | 8/2018 | Salmon | .................... | B60T 7/12 |
| 2018/0281770 A1 * | 10/2018 | Chen | ........................ | G07C 5/008 |
| 2019/0196501 A1 * | 6/2019 | Lesher | ................. | B60T 8/1708 |
| 2021/0094577 A1 * | 4/2021 | Shalev-Shwartz | .......................... | |
| | | | | B60W 30/0953 |
| 2021/0188234 A1 * | 6/2021 | Iwama | .................... | B60T 8/329 |

FOREIGN PATENT DOCUMENTS

| | | |
|---|---|---|
| CN | 104265803 A | 1/2015 |
| CN | 107776604 A | 3/2018 |
| DE | 4427170 C1 | 10/1995 |
| DE | 19911902 C1 | 8/2000 |
| DE | 10338564 A1 | 3/2005 |
| DE | 102016222565 A1 | 5/2018 |
| EP | 3061660 A1 | 8/2016 |
| JP | H09100855 A | 4/1997 |
| JP | 2009119888 A | 6/2009 |
| JP | 2015054552 A | 3/2015 |
| KR | 0184411 B1 | 4/1999 |
| KR | 20040045200 A | 6/2004 |

OTHER PUBLICATIONS

Extended European Search Report from corresponding European Application No. 18192560.7, dated Feb. 28, 2019, 7 pages.

* cited by examiner

BRAKE PERFORMANCE OPTIMIZER

RELATED APPLICATION DATA

This application is a continuation of International Patent Application No. PCT/CN2019/106207, filed Sep. 17, 2019, which claims the benefit of European Patent Application No. 18195260.7, filed Sep. 18, 2018, the disclosures of which are incorporated herein by reference in their entireties.

TECHNICAL FIELD

The present invention relates to the field of vehicles. A vehicle uses a variety of techniques to make the ride as safe as possible and the brakes is a basic feature for a safe travelling that is used to reduce the speed of the vehicle and to stop the vehicle.

BACKGROUND

There is thus a need to even further reduce the risk of that the brakes of the vehicle is not functioning as intended. There is also a need to increase the brake performance of the brakes also in conditions that is poor for the performance of the brake. By brake performance is meant the ability of the brakes to reduce the speed of the vehicle or to stop the vehicle.

Brake performance is dependent on a set of parameters, wherein temperature is one. Cold and wet brakes will decrease the brake performance of the brakes. As an example, cold and wet brakes can increase the time to lock up of the brakes up to 500 ms; in 100 kph this extra time will give around 14 m extra stop. The extra stop distance is also even more critical due to the combination of bad brake performance and low road fiction (cold, wet road surface, bad weather). The temperature of the brakes will decrease if they are not used for a period of time and thus also the brake performance will decrease over time if the brakes is not used. The humidity/wetness of the brakes will increase if they are not used for a period of time and thus also the brake performance will decrease over time also for this reason if the brakes is not used.

The brakes releases particles to the surroundings when the brakes are applied and there are a focus in the automotive industry to reduce these particles to reduce the impact on the environment.

SUMMARY

An object of the present invention is to provide a brake system and a method, which seek to mitigate, alleviate, or eliminate one or more of the above-identified deficiencies in the art and disadvantages singly or in any combination.

The inventors have identified that there is a need for predicting the brake performance of the brakes and to increase the brake performance of the brakes if the brake performance is too low. Further, there is a need to predicting the brake performance of the vehicle and use this information as an input to a driving assisting unit to enable it to assist the driver in a better way by a better prediction of when to start braking.

Further, there is a need to reduce the amount of particles released from the brakes to the environment.

In this disclosure, a solution to the problem outlined above is proposed. In the proposed solution, a brake system for controlling the brake performance of a vehicle is disclosed. The brake system comprise at least a brake, a control unit connected to one or more external condition sensors, one or more brake performance sensor, the brake and a driver assistance unit, wherein the external condition sensors are configured to obtain parameters regarding conditions surrounding the vehicle, the brake performance sensors are configured to obtain parameters regarding conditions of the brake, the driver assistance unit is configured to monitor the surroundings of the vehicle and estimate a probability value of that the brakes should be applied to avoid a collision, the control unit is configured to receive the obtained parameters from the external condition sensors and the estimated probability value from the driver assistance unit and determine, based on said parameters and said probability value, a surrounding threat level of the vehicle, receive the obtained parameters from the brake performance sensors and determine, based on said parameters, a brake performance level, and heat the at least one brake if the brake performance level is below a first level and the surrounding threat level is above a second level.

By having a brake system according to this the brakes of the vehicle will have a brake performance at, or above, a desired level even when there is a risk of that the brake performance is degraded. The reasons for degrading can be that there are a lot of rain or snow in the air and on the road, that the outside temperature is low and that the brakes has not been used for some time due to the road and traffic conditions. An example of such a situation could be when the vehicle has been driving on a highway for some time in snowy conditions and without the need to slow down. These conditions will degrade the brake performance of the vehicle as the brakes are cooled and snow and ice could build up on the brakes, however, the brake system will overcome the degradation and arrange the brakes to a brake performance that is above a desired level by heating the brakes. The invention enables a reduced stop distance for a vehicle in low road friction situations (i.e. bad weather) due to the warming/heating of the brakes and a determination of when to perform pre warming of brakes i.e. under which weather circumstances would it be beneficial to pre warm the brakes. When the brakes is heated, the temperature of the brakes increases and the brake gets dry. The heat can melt snow on the brakes and the water is thereafter evaporated such that the brake is heated and dry. Further, by having the heating of the brakes based on also the probability value of that the brakes will actually be used will reduce or avoid heating the brakes when they will not actually be used. This will increase the probability of that the brakes are in good conditions when they should be applied and the reduction of unnecessary heating will reduce any unnecessary heating of the brakes and thus reduce the amount of particles released from the brakes. By lowering the amounts of particles released also the impact on the environment is reduced.

Further, by having a control unit that is configured to heat the at least one brake by regulating the brake to brake, the brake performance could held at or above a desired level by using the brake itself to increase the temperature of the brake. By the wording brake the brake or apply the brake is meant that the brake is regulated/activated/applied/brake to slow down the vehicle or to heat the brake.

According to an aspect the control unit is configured to heat the at least one brake by regulating a heating unit to heat the at least one brake.

According to an aspect the estimated probability value is at least based on a hypothetically calculated time to collision if the at least one brake is not applied. By including the time to collision in the estimation the heating of the brakes could even further be limited to when it actually will be used or when there is a relatively high probability of that it should be applied.

According to an aspect the control unit is configured to determine the surrounding threat level to be above the second level only if the probability value is higher than a third value, such that the at least one brake is only heated if the probability of that it should be used is above the third level. According to an aspect the third level could be between 10-100%, or 20-100% or 30-100% or above 50%.

According to an aspect the brake performance sensor is configured to obtain parameters regarding one or more of a temperature of the at least one brake, the time from a previous braking of the brake and the energy of the previous braking of the brake.

According to an aspect the external condition sensor is configured to obtain parameters regarding one or more of the outside temperature, type of precipitation, amount of precipitation falling, intensity of precipitation, amount of precipitation on the road and a cooling effect of a rim of the vehicle.

According to an aspect the external condition sensor is one or more of a light detection and ranging sensor (LIDAR sensor) configured to detect an amount of snow and rain on a road, a camera configured to detect an amount of snow and rain on the road, a accelerometer configured to detect water puddles on the road, a wiper configured to detect an amount of snow and/or rain on a window of the vehicle and a temperature sensor configured to detect a ambient temperature of the vehicle.

According to an aspect the brake system comprise a wireless unit connected to the control unit and configured to receive information/data of the weather, traffic and/or road conditions at the vehicle from an external unit or a cloud service and wherein the control unit is configured to receive the information/data from the wireless unit and to determine the brake performance level and/or the surrounding threat level also based on said received information/data.

According to an aspect the control unit is configured to at least assist in apply the brake.

According to an aspect the driver assistance unit is configured to monitor the surroundings of the vehicle and to at least assist in applying the brake According to an aspect the driver assistance unit tracks moving and fixed objects in the surrounding of the vehicle. The driver assistance unit makes a risk assessment based on the tracked data and calculates the probability value and/or the hypothetical value of time to collision, i.e. a value of the risk of when a hypothetically collision could occur if no action is taken According to an aspect the driver assistance unit is configured to receive the obtained parameters from the brake performance sensor and/or the obtained parameters from the external condition sensor from the control unit and to determine when and how to assist in applying the brake at least based on said parameters.

According to an aspect the control unit is configured to heat the brake to a temperature at least above a pre-set temperature.

According to an aspect the control unit is connected to an accelerator of the vehicle and configured to control the accelerator to accelerate the vehicle to counteract a retardation of the vehicle when the brake is applied to heat the brake.

According to an aspect the control unit is configured to heat the brake if the brake performance level is degraded a pre-set value over a pre-set time and/or the surrounding threat level is increased a pre-set value over a pre-set time.

In another aspect of the invention, a method for increasing the brake performance of a brake of a vehicle comprising a brake system comprising at least a brake, a control unit connected to one or more external condition sensors, one or more brake performance sensors and a driver assistance unit is disclosed. The method comprise the steps of obtaining, by the external condition sensors, parameters regarding conditions surrounding the vehicle, obtaining, by the brake performance sensors. parameters regarding conditions of the brake, determining, by the driver assistance unit, a probability value of that the brakes should be applied to avoid a collision, receiving, in the control unit, the parameters regarding conditions surrounding the vehicle, the parameters regarding conditions of the brake and the probability value, determining, in the control unit, a surrounding threat level of the vehicle based on said parameters regarding conditions surrounding the vehicle and the probability value, determining, in the control unit, a brake performance level based on said parameters regarding conditions of the brake, and heating the brake by braking the brake if the brake performance level is below a first level and the surrounding threat level is above a second level.

According to an aspect the step of obtaining parameters regarding conditions surrounding the vehicle comprise obtaining parameters regarding one or more of snow on the road, rain on the road, amount of snow, amount of rain, the cooling effect of a rim of the vehicle, the weather conditions, the traffic conditions and road conditions.

According to an aspect the step of obtaining parameters regarding conditions of the brake comprise obtaining parameters of the temperature of the brake, the time since the brake was applied previously and the energy of the previous braking.

According to an aspect the method further comprise the step of accelerating the vehicle to compensate for the braking and uphold a constant speed of the vehicle.

According to an aspect the step of determining the probability value comprises calculating a hypothetically time to collision of the vehicle if the brakes are not applied.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

The foregoing will be apparent from the following more particular description of the example embodiments and aspects, as illustrated in the accompanying drawings in which like reference characters refer to the same parts throughout the different views. The drawings are not necessarily to scale, emphasis instead being placed upon illustrating the example embodiments and aspects.

DETAILED DESCRIPTION

Figure 1:
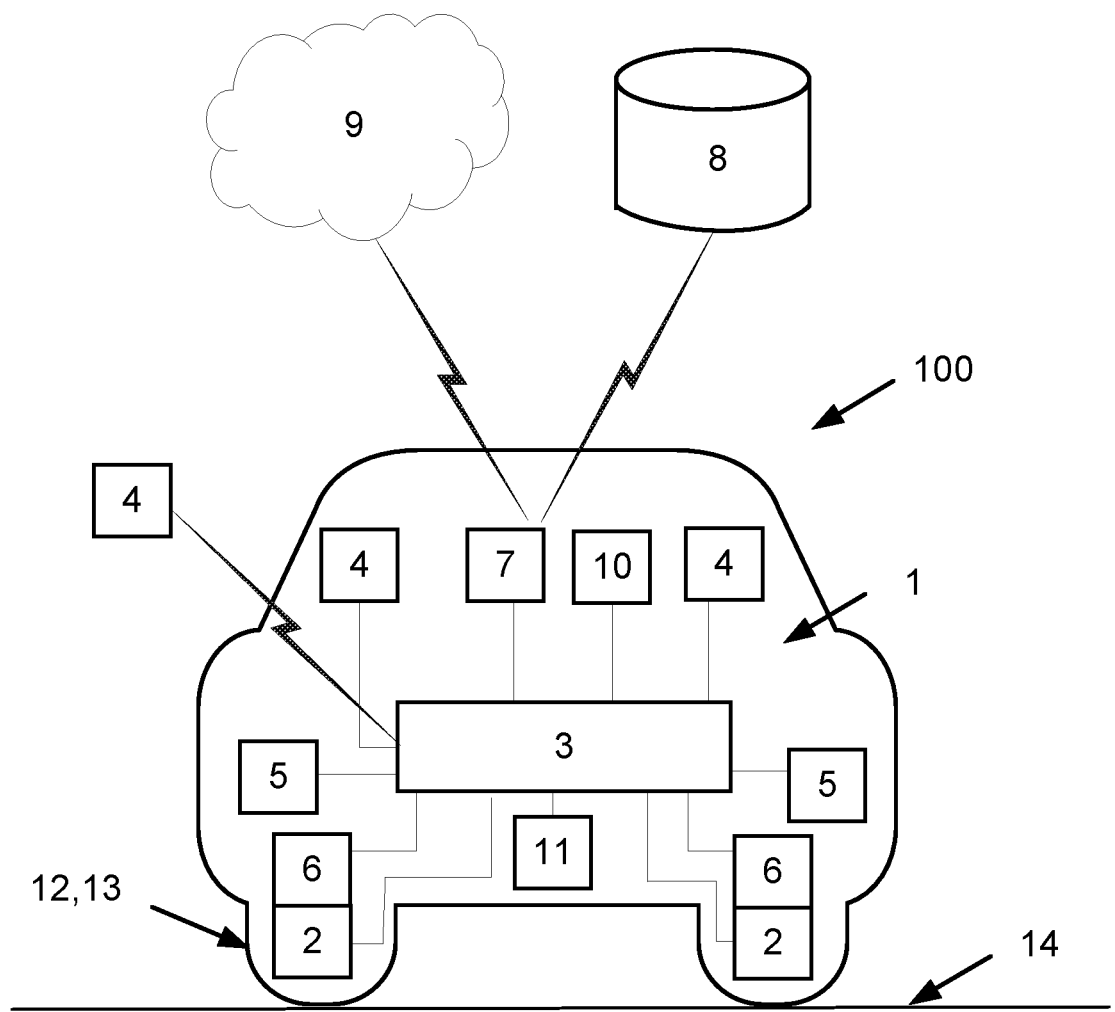
FIG. 1 discloses a schematic view of a vehicle comprising a brake system according to the invention.

The present invention will now be described more fully hereinafter with reference to the accompanying drawings, in which exemplary embodiments and aspects of the invention are shown. The invention may, however, be embodied in many different forms and should not be construed as limited to the embodiments and aspects set forth herein; rather, these embodiments and aspects are provided for thoroughness and completeness. Like reference characters refer to like elements throughout the description. The drawings are not necessarily to scale and certain features may be exaggerated in order to better illustrate and explain the exemplary embodiments of the present invention.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps in the method can occur out of the order noted in the operational illustrations. For example, two steps shown in succession can in fact be executed substantially concurrently or the steps can sometimes be executed in the reverse order, depending upon the functionality/acts involved.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Although the invention will be described in relation to a car, the invention is not restricted to this particular vehicle, but may as well be installed in other type of vehicles such as minivans, recreational vehicles, off-road vehicles, trucks, buses or the like.

In the description given below, the invention is particularly described with respect to the heating of disc brakes of cars. However, this is for convenience only and it should be appreciated that the invention is equally applicable to any type of braking system and to any type of vehicle.

In FIG. 1, to which now is referred to, disclose schematic view of vehicle 100 comprising a brake system 1. The brake system 1 is configured for controlling the brake performance of the vehicle 100. The brake system 1 comprises at least a brake 2, a control unit 3, one or more external condition sensor 4 and one or more brake performance sensor 5.

The brake 2 is configured to brake the vehicle 100 and thereby reduce the speed of the vehicle 100 and stop the vehicle 100. The brake system 1 is configured to regulate the brake 2 without any input from a driver of the vehicle 100. Put in another way, the brake system 1 is able to apply the brake 2 of the vehicle 100 autonomously. When the brake 2 is activated it reduces the rotational speed of a wheel 12 and a rim 13 of the vehicle 1. A part of the kinetic energy of the vehicle 1 will be transformed to heat when the brake 2 is braking the vehicle 1 and heat/warm and dry the brake 2. The brake 2 as such is known in the art and will thus not be described in more detail herein.

The control unit 3 is connected to a driver assistance unit 10. According to an aspect the driver assistance unit 10 is configured to monitor the surroundings of the vehicle 100 and estimate a probability value of that the brakes 2 should be applied to avoid a collision. The estimated probability value is according to an aspect at least based on a hypothetically calculated time to collision if the at least one brake 2 is not applied.

According to an aspect the control unit 3 is configured to determine the surrounding threat level to be above the second level only if the probability value is higher than a third value, such that the at least one brake 2 is only heated if the probability of that it should be used is above the third level.

The control unit 3 is connected to the one or more external condition sensors 4, the one or more brake performance sensor 5 and the brake 2. The control unit 3 is configured to receive obtained parameters from the external condition sensors 4 and the estimated probability value from the driver assistance unit 10. The control unit 3 is configured to determine, based on said parameters and said probability value, a surrounding threat level of the vehicle 100.

The control unit 3 is configured to receive the obtained parameters from the brake performance sensors 5. The control unit 3 is configured to determine, based on said parameters, a brake performance level.

The control unit 3 is configured to heat the at least one brake 2 if the brake performance level is below a first level and the surrounding threat level is above a second level. By heating the brake 2 the ability of the brake 2 to brake the vehicle 100 will improve, such that they are ready to be used by the driver or an autonomous driving system when the vehicle should be stopped or the speed should be reduced. However, the heating of the brake 2 consumes energy and to be efficient and save energy the heating should be performed when the brake performance level is below a certain level, i.e. when the ability of the brake 2 to brake the vehicle 100 is below a certain level, and when the surrounding threat level, i.e. when the probability of that the brake 2 will be used is above a certain level. Further, by having the heating of the brakes 2 further based on the probability value of that the brakes 2 will actually be used, the brakes 2 will be in good conditions when they should be used and reduce or avoid heating the brakes 2 when they will not actually be used. This will increase the probability of that the brakes 2 are in good conditions when they should be applied and the reduction of unnecessary heating will reduce any unnecessary heating of the brakes 2 and thus reduce the amount of particles released from the brakes 2. By lowering the amounts of particles released also the impact on the environmental will be reduced.

According to an aspect the brake performance level below which control unit 3 of the breaking system 1 should start heating the brake 2 is set in relation to the type of vehicle and could be changed. According to an aspect the surrounding threat level above which control unit 3 of the breaking system 1 should start heating the brake is set in relation to the type of vehicle 100 and could be changed.

According to an aspect the surrounding threat level above which control unit 3 of the breaking system 1 should start heating the brakes is set in relation to the type of the brakes 2.

According to an aspect the brake performance level and the surrounding threat level below/above which control unit 3 of the breaking system 1 should start heating the brake 2 are pre-set in the brake system 1.

According to an aspect the brake performance level and the surrounding threat level below/above which control unit 3 of the breaking system 1 should start heating the brake 2 could be altered by the user of the vehicle 100.

The external condition sensors 4 are configured to obtain parameters regarding conditions surrounding the vehicle 100. The external condition sensor 4 is configured to obtain parameters regarding one or more of the outside temperature, type of precipitation, amount of precipitation falling, intensity of precipitation, amount of precipitation on the road and a cooling effect of the rim 13 of the vehicle 100. According to an aspect the external condition sensor 4 is a light detection and ranging sensor (LIDAR sensor). The LIDAR is configured to detect an amount of snow and rain on a road 14 that the vehicle 100 is traveling on. According to an aspect the external condition sensor 4 is a camera. The camera is configured to detect the amount of snow and rain on the road. According to an aspect the external condition sensor 4 is an accelerometer. The accelerometer is configured to detect water puddles on the road 14. According to an aspect the external condition sensor 4 is a wiper. The wiper is configured to detect an amount of snow and/or rain on a window or a lamp of the vehicle 100. According to an aspect this is achieved by sensing the speed of the wiper. According to an aspect this is achieved by sensing the force that the wiper has to be moved with, i.e. the wiper for instance has to be moved with a higher force if it moves snow than if it moves water/rain. According to an aspect the external condition sensor 4 is a temperature sensor. The temperature sensor is configured to detect an ambient temperature of the vehicle 100. According to an aspect the external condition sensor 4 is a combination of any of the above external condition sensors 4. The external conditions sensors 4 according to an aspect have other functions in the vehicle 100 and in many cases already existing sensors/features of the vehicle 100 could be used as the external condition sensor 4. This double use of the external condition sensors 4 will reduce the cost of implementing the brake system 1 into a vehicle 100 as many of the hardware already exist, but are used for another function. According to an aspect the external condition sensor 4 is configured to estimate the type of precipitation, i.e. if it rains or snows. According to an aspect the external condition sensor 4 is configured to estimate the amount of precipitation, i.e. how much it rains or snows and the amount of rain or snow on the road 14. The surrounding threat level increases if the amount of perspiration increases and if the temperature drops.

According to an aspect one or more of the external condition sensor 4 is not positioned on/in the vehicle 100. According to an aspect the external condition sensor 4 is a database or a cloud service 4. The database and/or cloud service 4 according to an aspect obtains parameters of the weather conditions from a weather forecast provider. According to an aspect the weather forecast comprise parameters of if it is going to rain or snow at the location of the vehicle 100, how much it is going to rain/snow and how much rain/snow that have/will fall within a past or future period of time.

The database and/or cloud service 4 according to an aspect obtains parameters of the road conditions from a road condition provider. According to an aspect the road conditions comprise parameters regarding one or more of the official speed for the road, the number of curves that the vehicle 100 have/will pass, the radius of the curves that the vehicle 100 have/will pass. Based on these parameters an estimation of how much the brake 2 of the brake system 2 has been used and/or will be used could be predicted. If the vehicle 2 for instance is traveling on a road with many tight curves, the probability of that the brake 2 has been used is higher than if the vehicle 100 is traveling on a straight road. As an example, the surrounding threat level increases if the vehicle 100 is traveling on a straight road and is approaching a tight curve.

The database and/or cloud service 4 according to an aspect obtains parameters of the traffic conditions from a traffic provider. According to an aspect the traffic conditions comprise parameters regarding one or more of the amount of traffic at the vehicle 100, that the vehicle 100 has passed and that the vehicle 100 is approaching. If for instance the vehicle 100 is approaching an area with a lot of traffic the probability of that the brake 2 will be applied increases and the brake 2 should be in a state where they function as intended to avoid any accidents or incidents, i.e. an increased surrounding threat level.

A prediction of the status of the surroundings of the vehicle 100, i.e. the surrounding threat level, could be estimated based on one or more parameters obtained by the external condition sensors 4. If the status of the surroundings of the vehicle 100 is poor, i.e. it is heavy snow/rain, cold temperatures, heavy traffic etc., the surrounding threat level is set to a high value and if the status of the surroundings of the vehicle 100 is OK/good the surrounding threat level is set to a low value. The value of the surrounding threat level is according to an aspect not a direct indication of the status of the surroundings, however, in comparison to other values of the surrounding threat levels it will be an indication of if the status of the surroundings is degrading or improving.

The brake performance sensors 5 are configured to obtain parameters regarding conditions of the brake 2. The brake performance sensor 5 is configured to obtain parameters regarding one or more of a temperature of the at least one brake 2, the time from a previous braking of the brake 2 and the energy of the previous braking of the brake 2. According to an aspect the brake performance sensor 5 is a temperature sensor 5. The temperature sensor 5 is configured to measure parameters of the temperature of the brake 2. According to an aspect the brake performance sensor 5 is a force sensor 5. The force sensor 5 is configured to measure parameters of the force that the brake 2 has applied. The force sensor 5 is according to an aspect configured to measure parameters of the kinetic energy that has been transformed by the brake 2. According to an aspect the brake performance sensor 5 is a timer 5 that is measuring parameters of when and/or for how long the brake 2 is active.

According to an aspect one or more of the brake performance sensor 5 is not positioned on/in the vehicle 100. According to an aspect the brake performance sensor 5 is a database or a cloud service 5. The database and/or cloud service 5 according to an aspect obtains parameters of the road conditions at the vehicle 100 and that the vehicle 100 has passed. If the vehicle 100 has been traveling on a road with a high number of curves, the probability of that the brake 2 has been used is higher than if it has travelled on a straight road, i.e. an estimation could be made that the brake performance level is higher (i.e. better performance of the brake) if the vehicle 100 has passed a road that is curved than if the vehicle 100 has been traveling on a straight road.

The database and/or cloud service 5 according to an aspect obtains parameters of the weather conditions at the vehicle 100. If the weather conditions/forecast shows that it is raining or snowing and that the temperature is low, the probability of that the brake performance level of the brake 2 is lower than if the weather is sunny.

A prediction of the status of the brake 2, i.e. the brake performance level, could thus be estimated based on one or more parameters obtained by the brake performance sensors 5. If the status of the brake 2 is poor, i.e. the braking ability is degraded, the brake performance level is set to a low value and if the status of the brake 2 is OK/good, the brake performance level is set to a high value. The value of the brake performance level is according to an aspect not a direct indication of the status of the brake 2 as such, however, in comparison to other values of the brake performance level it will be an indication of if the brake performance is degrading or improving.

According to an aspect the brake performance sensor 5 and an external condition sensor 4 is an integrated sensor that could obtain data of several parameters.

According to an aspect the brake performance sensor 5 and/or the external condition sensor 4 are virtual sensors. Put in another way, the sensors 4, 5 do not have to include hardware and could be based on software.

The control unit 3 is further configured to heat the at least one brake 2 by regulating the brake 2 to brake. An efficient way to heat the brake 2 is to apply the brake 2. The control unit 3 is configured to apply the brake 2 for the purpose of heating the brake 2, i.e. the purpose is not to stop the vehicle 100 or to reduce the speed of the vehicle 100. According to an aspect the control unit 3 regulates the brake 2 to brake in a predefined brake pattern, i.e. to brake at different intensity and different times, to heat the brake 2. According to an aspect the brake 2 is applied until the status of the brake performance level is above the first level. According to an aspect the brake 2 is applied until the status of the brake performance level is above a pre-set value that is higher than the first level. According to an aspect the brake 2 is regulated by the control unit 3 to apply the brake 2 to heat the brake 2 in a pattern that have a low impact on the speed of the vehicle 100. Thereby the driver of the vehicle 100 will not perceive the braking. According to an aspect the control unit 3 is configured to apply the brakes 2 such that it is easy to perceive it for the driver of the vehicle 100, such that the driver will get information of that the surrounding threat level of the vehicle 100 is increased. If there is an increased surrounding threat level at the vehicle 100 it is useful information to the driver as this could affect how the driver drives the vehicle 100. According to an aspect the surrounding threat level is used as input to a driver assistance system 10.

According to an aspect the brake system 1 comprise a heating unit 6. The heating unit 6 is configured to heat the brake 2. The control unit 3 is connected to the heating unit 6. The control unit 3 is configured to heat the at least one brake 2 by regulating a heating unit 6 to heat the at least one brake 2. According to an aspect the heating unit 6 comprise a heating element. The heating unit 6 is configured to heat the brake 2 such that the brake performance level increases and the brake 2 is in a status such that they are able to brake the vehicle 100 in an intended manner. By heating the brake 2 with the heating unit 6, the speed of the vehicle 100 is not affected.

According to an aspect the control unit 3 is configured to heat the brake 2 by a combination of regulating the brake 2 to brake and by the heating unit 6.

The brake system 1 comprises the driver assistance unit 10. The control unit 3 is connecter to the driver assistance unit 10 that is configured to monitor the surroundings of the vehicle 100. According to an aspect the driver assistance unit 10 is configured to at least assist in apply the brake 2. The control unit 3 is configured to receive data from the driver assistance unit 10. The driver assistance unit 10 tracks moving and fixed objects in the surrounding of the vehicle 100. The driver assistance unit 10 makes a risk assessment based on the tracked data and estimate a probability value of that the brakes 2 should be applied to avoid a collision. The estimation comprises according to an aspect to calculate a hypothetically value of a time to collision, i.e. a value of the risk of when a hypothetically collision could occur if no action is taken. The driver assistance unit 10 as such is known in the art and will thus not be described in detail herein. The control unit is configured to determine the surrounding threat level of the vehicle 100 also based on the received data from the driver assistance unit 10. According to an aspect the driver assistance unit 10 is configured to receive the obtained parameters from the brake performance sensor 5 and/or the obtained parameters from the external condition sensor 4 from the control unit 3 and to determine when and how to assist in applying the brake 2 at least based on said parameters. According to an aspect the driver assistance unit 10 initiate a braking of the brake 2 earlier than usually if the brake performance level is below a set value to be certain that it is able to stop the vehicle 100 as intended.

According to an aspect the brake system 1 comprise a wireless unit 7. The wireless unit 7 is connected to the control unit 3. The wireless unit 7 is configured to receive information/data of the weather, traffic and/or road conditions at the vehicle 100 from an external unit 8 or a cloud service 9. According to an aspect the external unit 8 is a database. According to an aspect the control unit 3 is configured to receive the information/data from the wireless unit 7 and to determine the brake performance level and/or the surrounding threat level also based on said received information/data. According to an aspect the control unit 3 is connected to one or more of the brake performance sensors 5 and/or one or more of the external condition sensors 5 via the wireless unit 7. According to an aspect the wireless unit 7 is configured to send information from one or more of the brake performance sensors 5 and/or one or more of the external condition sensors 5 to the control unit 3.

According to an aspect the control unit 3 is configured to heat the brake 2 to a temperature at least above a pre-set temperature.

According to an aspect the brake system 2 comprise an accelerator 11. The control unit 3 is connected to the accelerator 11 and configured to control the accelerator 11 to accelerate the vehicle 100 to counteract a retardation of the vehicle 100 when the brake 2 is applied to heat the brake 2. Put in another way the vehicle 100 is accelerated by the control unit 3 as much as the control unit 3 brakes the vehicle 100 and thereby the speed of the vehicle 100 is not changed when the brake 2 is heated.

According to an aspect the control unit 3 is configured to heat the brake 2 if the brake performance level is degraded a pre-set value over a pre-set time and/or the surrounding threat level is increased a pre-set value over a pre-set time.

According to an aspect the brake system is configured to heat the at least one brake 2 if the brake performance level is below the first level.

According to an aspect the brake system is configured to heat the at least one brake 2 if the surrounding threat level is above a second level.

According to an aspect the control unit 3 is configured to determine the surrounding threat level to be above the second level only if the probability value is higher than a third value. The brakes 2 thus only heated if the probability of that it should be used is above the third level. By reducing the occasions when the brakes 2 are heated the impact of the environment is reduced, both due to that energy is saved and that the amount of particles released from the brakes 2 is reduced.

Figure 2:
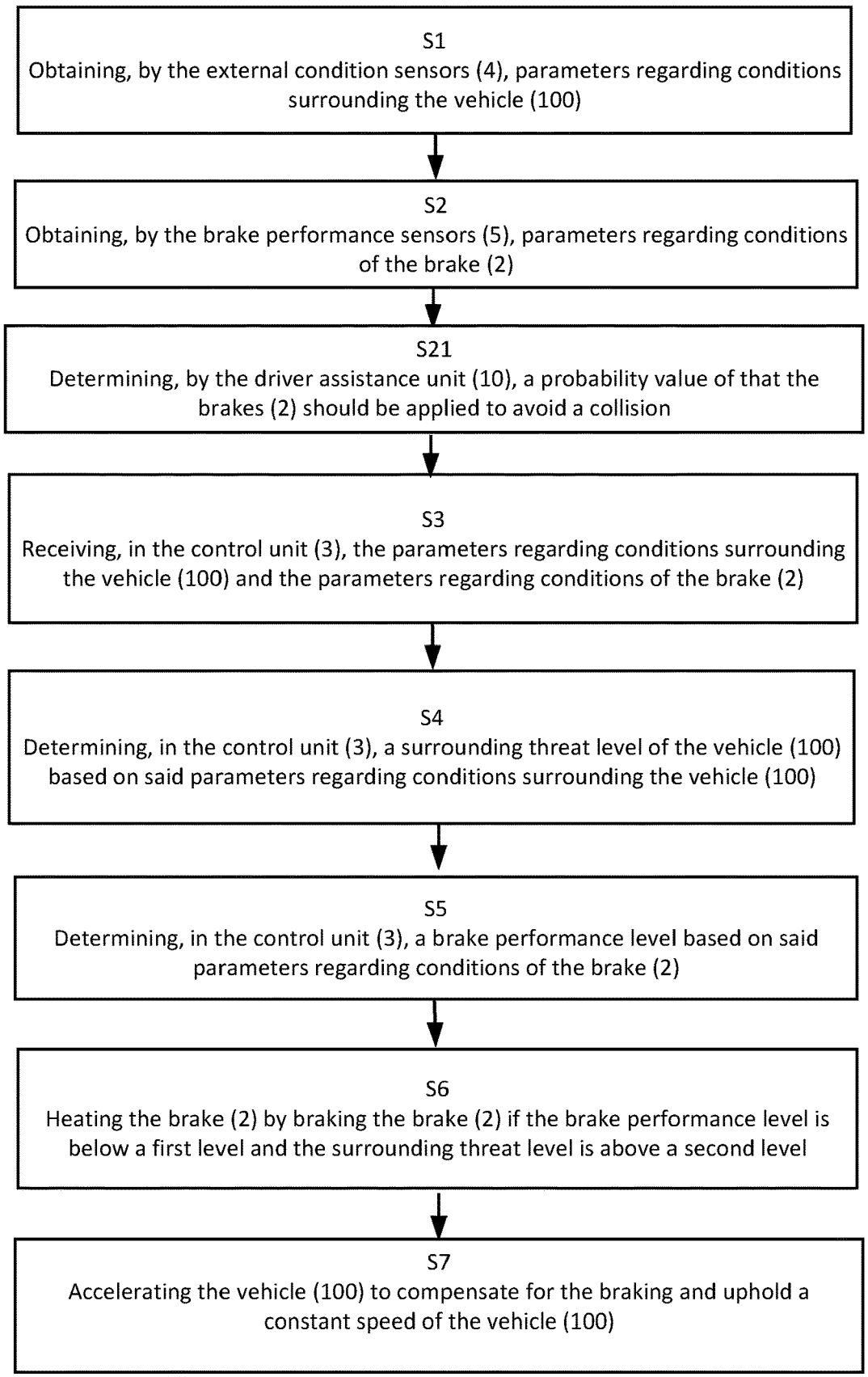
FIG. 2 discloses a flow chart of a method according to the invention.

Hereafter a method of operating the brake system 1 will be described in more detail in relation to FIG. 2. The method comprising the steps of obtaining S1, by the external condition sensors 4, parameters regarding conditions surrounding the vehicle 100, obtaining S2, by the brake performance sensors 5, parameters regarding conditions of the brake 2, determining S21, by the driver assistance unit 10, a probability value of that the brakes 2 should be applied to avoid a collision, receiving S3, in the control unit 3, the parameters regarding conditions surrounding the vehicle 100, the parameters regarding conditions of the brake 2 and the probability value, determining S4, in the control unit 3, a surrounding threat level of the vehicle 100 based on said parameters regarding conditions surrounding the vehicle 100 and the probability value, determining S5, in the control unit 3, a brake performance level based on said parameters regarding conditions of the brake 2, and heating S6 the brake 2 by braking the brake 2 if the brake performance level is below a first level and the surrounding threat level is above a second level.

According to an aspect the external condition sensors 4 and the brake performance sensor 5 continuously obtains data and parameters of the surroundings of the vehicle and the brake 2. The control unit 3 continuously receives the data/parameters and calculates/determines the present brake performance level and the surrounding threat level. The calculated/determined present brake performance level and surrounding threat level are thereafter compared with the first level and the second level. If the brake performance level is below the first level and the surrounding threat level is above the second level, the control unit 3 heats the brake 2 by braking the brake 2 and/or by regulating the heating unit 6 to heat the brake 2. As the brake 2 is heated, the brake performance level of the brake 2 is increased and the ability of the brake 2 to brake the vehicle 100 is increased.

According to an aspect the method further comprise that the step of obtaining S1 parameters regarding conditions surrounding the vehicle 100 comprise obtaining parameters regarding one or more of snow on the road, rain on the road, amount of snow, amount of rain, the cooling effect of a rim of the vehicle, the weather conditions, the traffic conditions and the road conditions.

According to an aspect the step of obtaining S2 parameters regarding conditions of the brake 2 comprise obtaining parameters of the temperature of the brake 2, the time since the brake 2 was applied previously, the energy of the previous braking.

According to an aspect the step of determining S21 the probability value comprises calculating a hypothetically time to collision of the vehicle if the brakes 2 are not applied.

According to an aspect the method further comprise the step of accelerating S7 the vehicle 100 to compensate for the braking and uphold a constant speed of the vehicle 100.

According to an aspect the step of heating S6 is performed if the brake performance level is below a third level that is lower than the first level. If the brake performance is too low, independently of the surrounding threat level, the control unit 3 of the braking system heats the brake 2, such that the vehicle 100 always have a certain status of the brake 2.

The person skilled in the art realizes that the present invention by no means is limited to the preferred embodiments described above. On the contrary, many modifications and variations are possible within the scope of the appended claims.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

What is claimed is:

1. A brake system for controlling the brake performance of a vehicle, the brake system comprising at least a brake, a control unit connected to one or more external condition sensors, one or more brake performance sensors, the brake and a driver assistance unit, wherein
    the external condition sensors are configured to obtain parameters regarding conditions surrounding the vehicle,
    the brake performance sensors are configured to obtain parameters regarding conditions of the brake,
    the driver assistance unit is configured to monitor the surroundings of the vehicle and configured to calculate an estimated a probability value of that the brakes should be applied to avoid a collision,
    the control unit is configured to:
        receive the obtained parameters from the external condition sensors and the estimated probability value from the driver assistance unit and determine, based on said parameters and said estimated probability value, a surrounding threat level of the vehicle,
        receive the obtained parameters from the brake performance sensors and determine, based on said parameters, a brake performance level, and
        heat the at least one brake upon determining that the brake performance level is below a first level and the surrounding threat level is above a second level.

2. The brake system according to claim 1, wherein the control unit is configured to heat the at least one brake by regulating the brake to brake.

3. The brake system according to claim 1, wherein the estimated probability value is at least based on a hypothetically calculated time to collision if the at least one brake is not applied.

4. The brake system according to claim 1, wherein the control unit is configured to determine the surrounding threat level to be above the second level only if the probability value is higher than a third value, such that the at least one brake is only heated if the probability of that it should be used is above the third level.

5. The brake system according to claim 1, wherein the brake performance sensor is configured to obtain parameters regarding temperature of the at least one brake, the time from a previous braking of the brake and the energy of the previous braking of the brake.

6. The brake system according to claim 1, wherein the external condition sensor is configured to obtain parameters regarding one or more of the outside temperature, type of precipitation, amount of precipitation falling, intensity of precipitation, amount of precipitation on the road and a cooling effect of a rim of the vehicle.

7. The brake system according to claim 1, wherein the external condition sensor is one or more of a light detection and ranging sensor (LIDAR sensor) configured to detect an amount of snow and rain on a road, a camera configured to detect an amount of snow and rain on the road, a accelerometer configured to detect water puddles on the road, a wiper configured to detect an amount of snow and/or rain on a window of the vehicle and a temperature sensor configured to detect a ambient temperature of the vehicle.

8. The brake system according to claim 1, further comprising a wireless unit connected to the control unit and configured to receive information/data of the weather, traffic and/or road conditions at the vehicle from an external unit or a cloud service and wherein the control unit is configured to receive the information/data from the wireless unit and to determine the brake performance level and/or the surrounding threat level also based on said received information/data.

9. The brake system according to claim 1, wherein the control unit is configured to at least assist in apply the brake.

10. The brake system according to claim 1, wherein the driver assistance unit is configured to receive the obtained parameters from the brake performance sensors and/or the obtained parameters from the external condition sensor from the control unit and to determine when and how to assist in applying the brake at least based on said parameters.

11. The brake system according to claim 1, wherein the control unit is configured to heat the brake to a temperature at least above a pre-set temperature, the temperature of the brake received by at least one of the brake performance sensors.

12. The brake system according to claim 1, wherein the control unit is connected to an accelerator of the vehicle and configured to control the accelerator to accelerate the vehicle to counteract an retardation of the vehicle when the brake is applied to heat the brake.

13. The brake system according to claim 1, wherein the control unit is configured to heat the brake if the brake performance level is degraded a pre-set value over a pre-set time and/or the surrounding threat level is increased a pre-set value over a pre-set time.

14. A method for increasing the brake performance of a brake of a vehicle comprising a brake system comprising at least a brake, a control unit connected to one or more external condition sensors, one or more brake performance sensors and a driver assistance unit, wherein the method comprises the steps of:
obtaining, by the external condition sensors, parameters regarding conditions surrounding the vehicle,
obtaining, by the brake performance sensors, parameters regarding conditions of the brake,
determining, by the driver assistance unit, a probability value of that the brakes should be applied to avoid a collision,
receiving, in the control unit, the parameters regarding conditions surrounding the vehicle, the parameters regarding conditions of the brake and the probability value,
determining, in the control unit, a surrounding threat level of the vehicle based on said parameters regarding conditions surrounding the vehicle and the probability value,
determining, in the control unit, a brake performance level based on said parameters regarding conditions of the brake, and
upon determining that the brake performance level is below a first level and the surrounding threat level is above a second level, heating the brake by braking the brake.

15. The method according to claim 14, wherein the step of obtaining parameters regarding conditions surrounding the vehicle comprise obtaining parameters regarding one or more of snow on the road, rain on the road, amount of snow, amount of rain, the cooling effect of a rim of the vehicle, the weather conditions, the traffic conditions and road conditions.

16. The method according to claim 14, wherein the step of obtaining parameters regarding conditions of the brake comprise obtaining parameters of the temperature of the brake, the time since the brake was applied previously, the energy of the previous braking.

17. The method according to claim 14, further comprising the step of accelerating the vehicle to compensate for the braking and uphold a constant speed of the vehicle.

18. The method according to claim 14, wherein the step of determining the probability value comprises calculating a hypothetically time to collision of the vehicle if the brakes are not applied.

19. The brake system of claim 1, wherein the brake performance level is based in part on the ability of the at least one brake to stop a vehicle as intended.

20. The brake system of claim 11, wherein the brake performance is based upon, at least in part, the temperature of the brake received from the brake performance sensors.

* * * * *